US006192140B1

(12) United States Patent
Reinhard et al.

(10) Patent No.: US 6,192,140 B1
(45) Date of Patent: Feb. 20, 2001

(54) PROCESS AND DEVICE FOR THE QUALITATIVE ASSESSMENT OF PROCESSED SHEETS

(75) Inventors: Gerald Josef Reinhard, Sulzfeld; Johannes Georg Schaede, Würzburg, both of (DE)

(73) Assignee: Koenig & Bauer-Albert Aktiengesellschaft, Wurzburg (DE)

( * ) Notice: Under 35 U.S.C. 154(b), the term of this patent shall be extended for 0 days.

(21) Appl. No.: 09/011,470

(22) PCT Filed: Jun. 13, 1997

(86) PCT No.: PCT/DE97/01201

§ 371 Date: Feb. 17, 1998

§ 102(e) Date: Feb. 17, 1998

(87) PCT Pub. No.: WO97/48556

PCT Pub. Date: Dec. 24, 1997

(30) Foreign Application Priority Data

Jun. 18, 1996 (DE) ............................................. 196 24 196

(51) Int. Cl.[7] ....................................................... G06K 9/00

(52) U.S. Cl. .................................... 382/112; 101/DIG. 42

(58) Field of Search .................................... 382/100, 112; 348/88, 125, 128; 356/430, 237.2, 101; 101/409, 410, 415.1, DIG. 42; 271/82, 196, 276, 277

(56) References Cited

U.S. PATENT DOCUMENTS 4,448,121 5/1984 Uno et al. .............................. 101/76
5,086,698 * 2/1992 Wirz ..................................... 101/409
5,186,107 2/1993 Wieland ............................... 101/409
5,241,907 * 9/1993 Dörsam et al. ....................... 101/409
5,317,390 5/1994 Bolza-Schunemann et al. ... 356/394
5,471,309 11/1995 Bolza-Schünemann ............. 356/394

FOREIGN PATENT DOCUMENTS 32 020 098 12/1982 (DE) ............................... B41F/13/46
42 06 366 2/1993 (DE) ............................... G06K/9/66
42 23 555 2/1993 (DE) ............................... B41F/21/10
42 17 942 12/1993 (DE) ............................... B41F/33/16
44 36 583 4/1996 (DE) ............................... B41F/25/00
0 317 665 5/1989 (EP) ............................... B41F/33/00
0 576 824 1/1994 (EP) ............................... B41F/33/00

OTHER PUBLICATIONS

English Translation of DE 44 36 583 to Butcher, Apr. 1996.*

* cited by examiner

*Primary Examiner*—Andrew W. Johns
(74) *Attorney, Agent, or Firm*—Jones, Tullar & Cooper, PC

(57) ABSTRACT

The quality of processed or printed sheets is assessed while the sheets are supported on the periphery of a drum. The surface of each drum is provided with sheet leading and trailing end gripper systems which are circumferentially, and axially shiftable with respect to each other. Each sheet to be inspected is stretched tightly on the periphery of its supporting drum before the quality of the printing or other processing done to the sheet is assessed.

1 Claim, 2 Drawing Sheets

PROCESS AND DEVICE FOR THE QUALITATIVE ASSESSMENT OF PROCESSED SHEETS

FIELD OF THE INVENTION

The present invention relates to a method and a device for the qualitative assessment of processed sheets.

DESCRIPTION OF THE PRIOR

DE 32 20 098 C2 describes a numbering machine with a device for the qualitative assessment, by means of two testing cylinders, of the front and reverse sides of sheets to be numbered.

It is a limitation of this prior art device that no guide elements for holding the sheets on the testing cylinders are provided.

DE 42 23 555 A1 discloses a drum for transporting sheets in a reversing device of a sheet-fed rotary printing press. This drum is provided with grippers for gripping the front edge of the sheets, and with displaceable suction elements for stretching the rear edge of the sheet tight.

SUMMARY OF THE INVENTION

It is the object of the present invention to create a method and a device for the qualitative assessment of processed sheets.

This object is attained in accordance with the present invention by providing at least one drum which receives the sheet to be inspected. This drum passes the sheet by an image recording device, and is provided with a first holding device that grips the leading end of the sheet. At least one second holding device is also provided on the drum and holds the trailing end of the sheet. The two holding devices stretch the sheet tightly both circumferentially and axially on the surface of the drum prior to the inspection of the sheet. Once the sheet has been gripped and stretched, one page on the sheet can be inspected.

By means of the method or the device in accordance with the present invention, it is possible in an advantageous manner to prevent false measurements because of sheets having creases or being dished or otherwise deformed. The dependability of the image inspection is considerably increased, in particular in case of sheets having creases.

The arrangement of two drums, both of which have two holding devices for stretching the sheets tight, in particular makes a dependable inspection of the front and reverse sides of the sheets after their processing is finished possible.

BRIEF DESCRIPTION OF THE DRAWINGS

The device for the qualitative assessment of processed sheets in accordance with the present invention is represented in the drawings and will be described in more detail in what follows.

Shown are in.

DESCRIPTION OF THE PREFERRED EMBODIMENT

Figure 1:
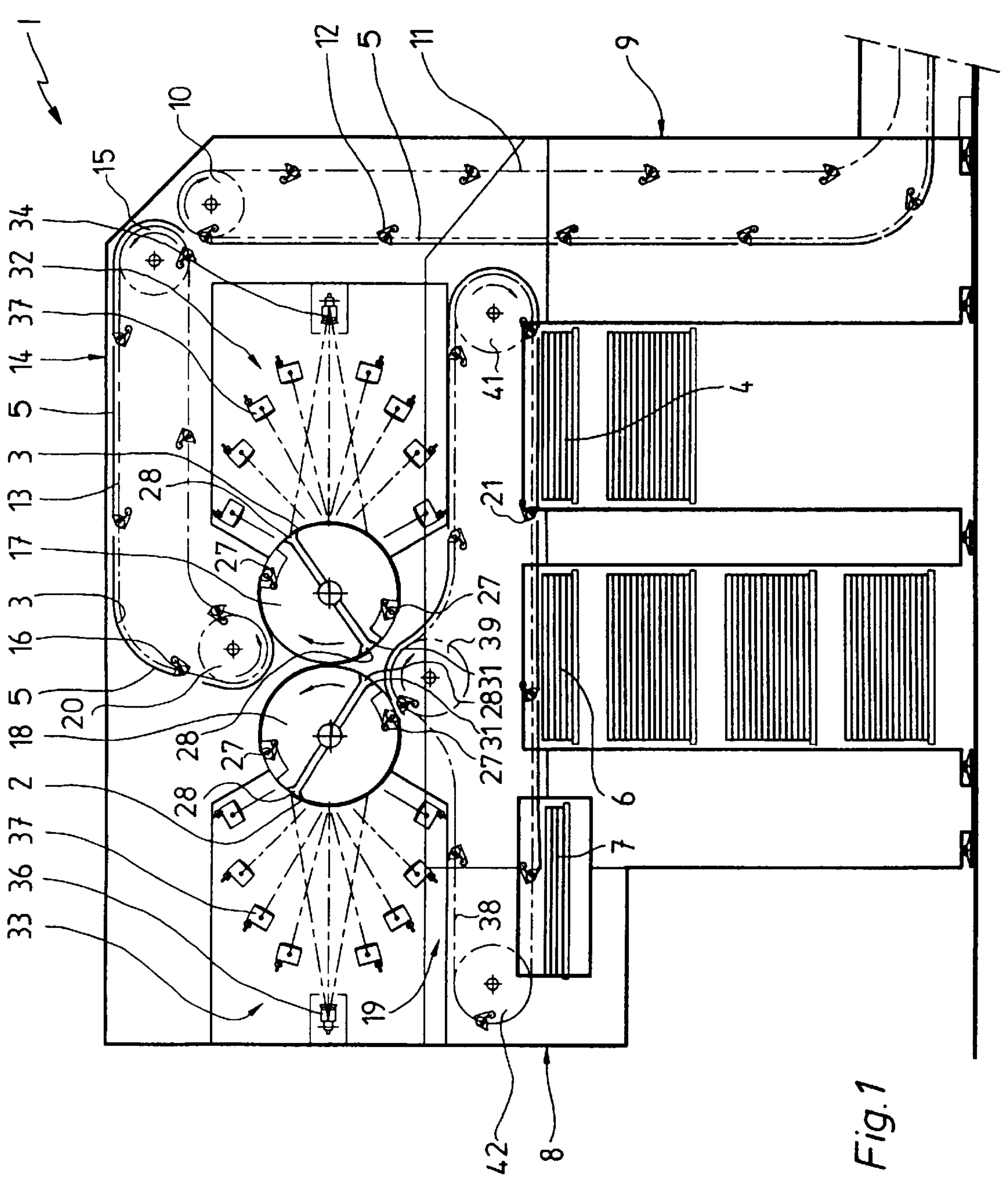
FIG. 1, a schematic lateral view of a device for the qualitative assessment of printed sheets.

A device generally at 1, for the qualitative assessment of processed sheets 5 has been installed in a sheet-processing machine. In the present preferred embodiment, this is a sheet-fed rotary printing press, which imprints sheets of paper 5 on their front and reverse sides 2, 3.

For reasons of simplification, only the sheet transport device downstream of the print units, as far as the deposit of the sheets 5 on stacks 4, 6, 7 in a delivery device 8, has been represented.

Processed sheets 5 are understood to be, for example, sheets 5 which have been printed, embossed or provided with a pattern in other ways.

A first chain conveyor 9 is arranged following a printing cylinder, not represented. The chains 11 of this chain conveyor 9 first extend horizontally in the vicinity of the floor, and then vertically as far as across the stacks 4, 6, 7 of the delivery device 8, to a first chain wheel 10. Chain gripper devices 12 are fastened on these chains 11. Following the vertical portion of this first chain conveyor 9, horizontally extending chains 13 of a second chain conveyor 14 are arranged, on which chain gripper devices 16 are also provided. These chains 13 are reversed by two chain wheels 15, 20. A first drum 17 is arranged to work together with these chain gripper devices 16, and a second drum 18 directly cooperates with it. Following this, a third chain conveyor 19, with chains 38 is arranged directly above the stacks 4, 6, 7, which conveys the sheets 5 to the stacks 4, 6, 7 of the delivery device 8. The chains 38 are reversed by means of three chain wheels 39, 41, 42. In the present preferred embodiment, chain gripper systems 21 of the third chain conveyor 19 can selectively deposit the sheets 5 on one of the three stacks 4, 6, 7. For example, inspected sheets 5, which do not comply with the present quality requirements, are deposited on one (in the example the left stack 7) of the three stacks 4, 6, 7.

Figure 2:
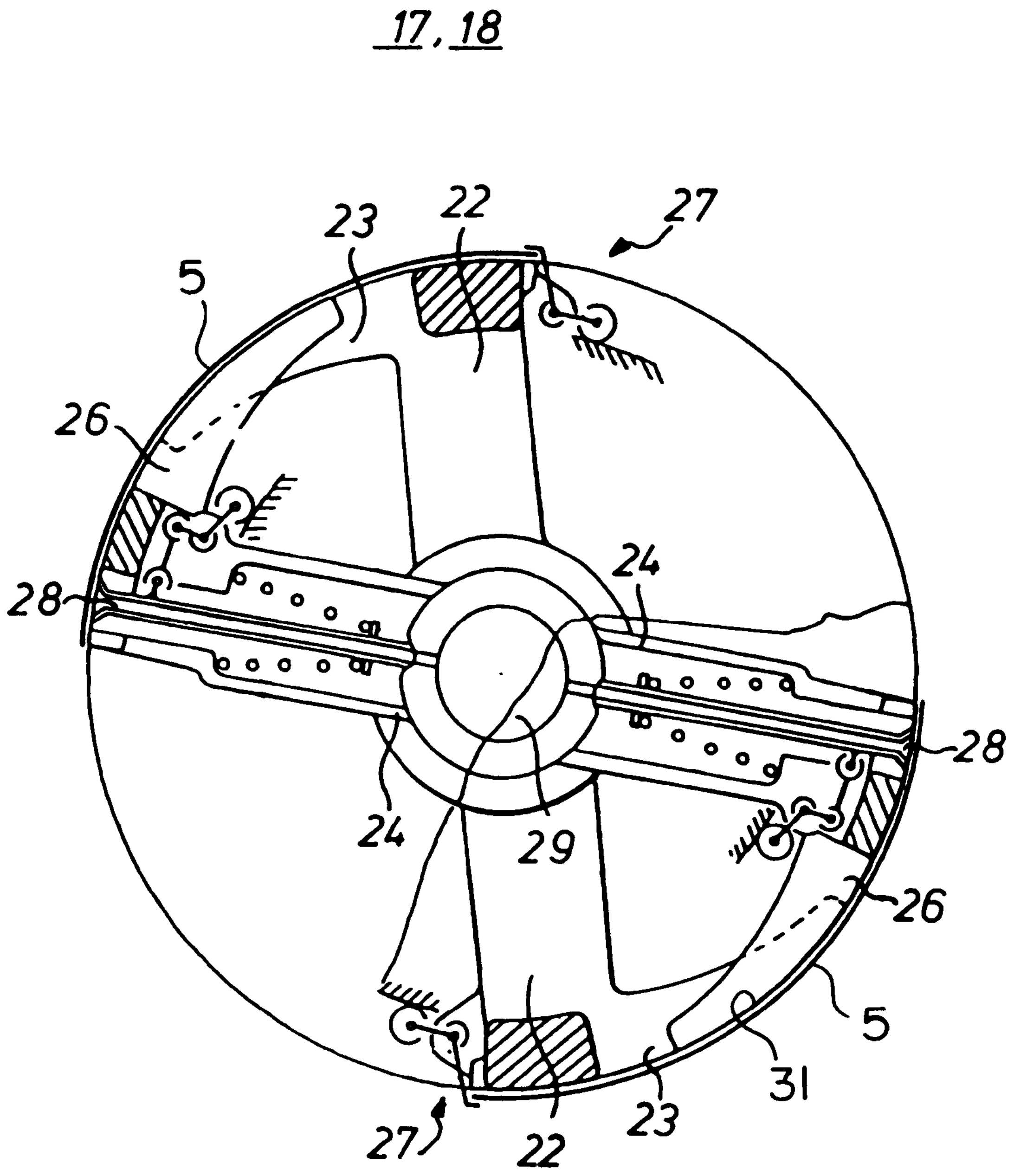
FIG. 2, a schematic plan view of a drum.

The two drums 17, 18 respectively, as seen also in FIG. 2, each consist essentially of a first drum base body 22 with first segments 23, a second drum base body 24 with second segments 26, and first holding devices 27 and second holding devices 28. The holding devices can be respectively embodied as gripper or suction devices. The first drum base body 22 is seated by means of hollow shaft journal in lateral frames of the delivery device 8. A shaft 29 is pivotably seated in this hollow shaft journal. The second segments 26 extending in the circumferential direction are fastened next to each other on this shaft 29. The second holding device 28 is arranged, displaceable in the circumferential direction and the axial direction, in the area of the ends of the segments 26. This second holding device 28 is constituted by a plurality of suction devices 28, arranged next to each other in the axial direction, which can be charged with suction air in a controlled manner.

The first holding device 27 in the form of controllable grippers 27, arranged next to each other in the axial direction, is provided at the beginning of the first drum base body 22. First 23 and second segments 26 are arranged meshing in a comb-like manner, so that a cylinder-shaped peripheral surface 31 is formed. The distance between suction devices 28 and grippers 27 in the circumferential direction, i.e. a length 131 of the surface 31 in the circumferential direction, can be adapted to a length 11 of the sheets 1 to be processed. To this end the first 23 and second segments 26 are pivotable in the circumferential direction and can be fixed in place following the process of setting the length of surface 31. In the present preferred embodiment, each drum 17, 18 is designed as a "double-size" drum 17, 18, i.e. two first 27 and two second holding devices 28 with the associated elements 23, 26 are arranged on the circumference, offset by 180° in respect to each other.

Each one of these two drums 17, 18 has been assigned its own inspection device. Essentially this inspection device, as shown in FIG. 1, consists of an illumination device 32, 33 and an image recording device 34, 36. In the present preferred embodiment, a plurality of stroboscopic flashes 37 is provided as the illumination device 32, 33, which are arranged in such a way that an even illumination of the sheet 5 to be inspected takes place. This means that an angle and a distance of the light outlet surface of the stroboscopic flashes 37 are matched to the surface 31 of the drum 17, 18 and to the lens of the image recording device 34, 36.

The respective image recording device 34, 36 consists of at least one planar CCD camera, preferably of two planar CCD cameras 34, 36, arranged next to each other in the axial direction of the drum 17, 18. Preferably four individual recordings, corresponding to each quadrant, are taken of each sheet 5 to be inspected, which are again superimposed on each other to form a whole image in an evaluation device connected downstream of the planar CCD cameras 34, 36. This whole image is then evaluated, for example in a method corresponding to the method described in DE 42 06 366 A1.

Two successive images per sheet 5 to be inspected are recorded by each one of the two planar CCD cameras 34, 36.

However, it is also possible to record a single image of the sheets 5 by means of a single planar CCD camera.

The inspection device is disposed downstream of the transfer area from the second chain conveyor 14 and the first drum 17 in such a way that, after stretching, the sheet 5 to be inspected is located in the evaluation area of the planar CCD camera 34. The second inspection device is arranged in the same way between the transition area from the first drum 17 to the second drum 18, or respectively the second drum 18 and the third chain conveyor 19.

The mode of operation of the device in accordance with the present invention is as follows:

The chain gripper devices 12 of the first chain conveyor 9 take over the printed sheets 5 from a printing cylinder, not represented. The inspection of the front 2 and reverse side 3 of the sheets 5 only takes place after printing, i.e. following complete processing, as the last work step prior to deposition in the sheet processing machine. These chain gripper devices 12 convey the sheets 5 first in the horizontal, then in the vertical direction to the second chain conveyor 14 arranged above the stacks 4, 6, 7, and transfer the sheets 5 to the first drum 17. In the process, the grippers 27 of the first drum 17 grip the beginning of the sheet 5 to be inspected. After approximately one-half rotation of the drum 17, the end of each of the sheets 5 reaches the area of the suction devices 28, which are thereupon charged with suction air and in this way grasp the end of the sheets 5. Subsequently, the suction devices 28 perform a movement both in the circumferential direction and the axial direction of the drum 17 and in this manner tightly stretch the sheet 5. Now the sheet 5 lies, free of creases, on the first drum 17. In the present example, the reverse side 3 of the sheets 5 faces away from the drum 17 and points in the direction toward the planar CCD cameras 34. Now the stroboscopic flashes 37 illuminate the sheet 5 for the first time, and the two planar CCD cameras 34 record the two adjoining individual images of the forward half of the sheets 5. The sheet 5 is stretched tight before the first single image is recorded. After a rotation of the drum 17 corresponding to one-half length of the sheet 5, the two successive individual images of the rear half of the sheet 5 are recorded. Only after all individual images, or respectively the total image, of the sheet 5 has been recorded, the sheet 5 is then transferred to the second drum 18 for inspecting the front side 2 of the sheet 5.

The grippers 27 of the first drum 17 transfer the beginning of the sheet 5 to the grippers 27 of the second drum 18. In this way the sheet is conveyed by the second drum 18 and the reverse side 3 of the sheet 5, which faced to the outside on the first drum 17, moves inward to overlie the surface 31 of the second drum 18, so that the front side 2 of the sheet 5 now faces to the outside. As soon as the suction devices 28 of the first 17 and the second drum 18 come into the transfer area (i.e. into the area of the common centers of the two drums 17, 18), the suction air for the suction devices 28 of the first drum is turned off and the suction devices 28 of the second drum 18 are charged with suction air. By means of this, the end of the sheet 5 is grasped by the suction devices 28 of the second drum 18. Subsequently, the suction devices 28 of the second drum 18 are moved in the circumferential direction and in the axial direction of the second drum 18. Here the suction force generated by the suction devices 28 on the end of the sheet 5 is designed to be such that, although the sheet 5 is stretched tightly, the sheet 5 begins to slide on the suction devices 28 before the tear resistance of the sheet 5 is overcome.

Only after the sheet 5 has been completely stretched tight on the second drum 18, are individual images of the forward half of the front side 2 of the sheet 5 recorded. Thereafter, the two individual images of the rear half of the sheet 5 are recorded. Here, too, the beginning of the sheet 5 is only transferred to the chain gripper devices 21 of the third chain conveyor 19 after the entire image of the sheet 5 has been completely recorded. The third chain conveyor 19 is triggered by the evaluation device of the inspection device in such a way, that it selectively deposits the inspected sheets 5 which satisfy the quality requirements on the first 4 or second stack 6, while the inspected sheets 5, which do not meet the quality requirements, are deposited on the third stack 7.

It is also possible for the sheets 5 to be inspected not to be directly transferred from the first drum 17 to the second drum 18, but to be transferred by means of interposed conveying means, for example further drums. In this case, the interposed conveying means are arranged in such a way, that the first side 3 of sheet 5 faces toward the outside on the first drum 17, and on the second drum the second side 2 of sheet 5 faces outward.

In place of the drums 17, 18, which stretch the sheets 5 tight, a chain conveyor can also be provided with two holding devices cooperating in pairs, for example. These holding devices are arranged so they perform a relative movement which stretches the sheets 5, wherein respectively one holding device grasps the beginning and one holding device the end of each of the sheets 5.

While a preferred embodiment of a method and device for the qualitative assessment of sheets in accordance with the present invention has been set forth filly and completely hereinabove, it will be apparent to one of skill in the art that a number of changes in, for example, the size of the sheets being printed, the type of printing being performed, the type of printing press being used, and the like could be made without departing from the true spirit and scope of the present invention, which is accordingly to be limited only by the following claims:

What is claimed is:

1. A method for accomplishing a qualitative assessment of processing on a sheet including:

providing a first image recording inspection and evaluation device including at least a first planar CCD camera facing a first side of a processed sheet to be assessed;

locating a first sheet support drum adjacent said first image recording inspection and evaluation device;

providing first and second sheet end holding devices on said first sheet support drum;

utilizing said first and second sheet end holding devices to grasp leading and trailing ends of a processed sheet supplied to said first sheet support drum;

moving at least one of said first and second sheet end holding devices circumferentially and axially on said first sheet support drum;

stretching said processed sheet circumferentialy on said first sheet support drum during said circumferential movement of said at least one of said first and second sheet end holding devices of said first sheet support drum;

stretching said processed sheet axially on said first sheet support drum during said axial movement of said at least one of said first and second sheet end holding devices of said first sheet support drum;

performing a qualitative assessment of said first side of said processed sheet in said first image recording inspection and evaluation device after said circumferential and axial stretching of said processed sheet on said first sheet support drum by taking two successive, circumferentially spaced images of said processed sheet using said first planar CCD camera;

providing a second image recording inspection and evaluation device including at least a second planar CCD camera facing a second side of said processed sheet to be assessed;

locating a second sheet support drum adjacent said second image recording inspection and evaluation device and after, in a direction of travel of said processed sheet said first sheet support drum;

providing first and second sheet end holding devices on said second sheet support drum;

utilizing said first and second sheet end holding devices of said second sheet support drum to grasp leading and trailing ends of said processed sheet supplied to said second sheet support drum from said first sheet support drum;

moving at least one of said first and second sheet end holding devices of said second sheet support drum circumferentially and axially on said second sheet support drum;

stretching said processed sheet circumferentially on said second sheet support drum during said circumferential movement of said at least one of said first and second sheet end holding devices of said second sheet support drum;

stretching said processed sheet axially on said second sheet support drum during said axial movement of said at least one of said first and second sheet end holding devices of said second sheet support drum;

performing a qualitative assessment of said second side of said processed sheet in said second image recording inspection and evaluation device after said circumferential and axial stretching of said processed sheet on said second sheet support drum by taking two successive, circumferentially spaced images of said processed sheet using said second planar CCD camera;

providing a processed sheet delivery device after, in said direction of travel of said processed sheet, said second sheet support drum;

locating at least first and second processed sheet receiving stacks in said processed sheet delivery device;

directing said processed sheets to said sheet delivery device from said second sheet support drum; and using said first and second image recording inspection and evaluation devices to deposit each said processed sheet on a selected one of said at least first and second processed sheet receiving stacks.

* * * * *